(12) United States Patent
Heid et al.

(10) Patent No.: US 7,223,041 B1
(45) Date of Patent: *May 29, 2007

(54) CAMMING COUPLER

(75) Inventors: Barry T. Heid, Yakima, WA (US);
Peter J. Abercrombie, Selah, WA (US)

(73) Assignee: Manhasset Specialty Co., Yakima, WA (US)

( * ) Notice: Subject to any disclaimer, the term of this patent is extended or adjusted under 35 U.S.C. 154(b) by 174 days.

This patent is subject to a terminal disclaimer.

(21) Appl. No.: 10/409,652

(22) Filed: Apr. 7, 2003

Related U.S. Application Data

(63) Continuation-in-part of application No. 09/602,751, filed on Jun. 23, 2000, now Pat. No. 6,543,960.

(51) Int. Cl.
*F16B 7/10* (2006.01)

(52) U.S. Cl. .............. 403/109.5; 403/109.1; 403/109.7; 403/350; 403/352; 403/374.1; 403/374.2; 248/157; 248/161; 248/410; 248/412

(58) Field of Classification Search ........... 403/109.1, 403/109.5, 109.8, 110, 289, 350–352, 366, 403/367, 377, 409.1, DIG. 8, 109.7, 374.1, 403/374.2; 248/441.1, 188.5, 157, 161, 410, 248/412; 108/147.18, 147.19, 146, 147.2
See application file for complete search history.

(56) References Cited

U.S. PATENT DOCUMENTS

| | | | | |
|---|---|---|---|---|
| 1,554,538 A | | 9/1925 | Walberg | 45/121 |
| 2,256,248 A | * | 9/1941 | Hansen | 403/DIG. 8 |
| 2,459,785 A | * | 1/1949 | Allerton | 248/412 |
| 2,538,318 A | | 1/1951 | Mitchell | 120/28 |
| 2,546,157 A | * | 3/1951 | Hume | 403/351 |
| 2,952,485 A | | 9/1960 | Hammond | 287/58 |
| 3,215,482 A | | 11/1965 | Litke | 312/233 |
| 3,637,172 A | | 1/1972 | Diesbach | 248/460 |
| 3,724,885 A | * | 4/1973 | Becker | 403/351 X |
| 4,524,484 A | * | 6/1985 | Graham | |
| 4,585,367 A | * | 4/1986 | Gall | 403/351 X |
| 4,606,525 A | | 8/1986 | Lombardi | 248/460 |
| 4,632,597 A | * | 12/1986 | Clausen et al. | 403/351 |
| 4,761,092 A | | 8/1988 | Nakatani | 403/104 |

(Continued)

FOREIGN PATENT DOCUMENTS

GB    2232735 A  * 12/1990

*Primary Examiner*—Patricia Engle
*Assistant Examiner*—Michael P. Ferguson
(74) *Attorney, Agent, or Firm*—Stratton Ballew PLLC

(57) ABSTRACT

A camming coupler for removably attaching a music desk or other object to an upright support leg. The camming coupler includes an inner sleeve for receiving the upright support leg. The inner sleeve has at least one longitudinal slit formed therein, and preferably has four substantially equidistant longitudinal slits. The inner sleeve also has a cammed exterior surface. An attachment member extends from the inner sleeve, and is attachable to the music desk or other object. The camming coupler further includes an outer sleeve positioned over the inner sleeve. The outer sleeve has a cammed interior surface that corresponds with the cammed exterior surface of the inner sleeve. In use, the camming coupler is secured to a music desk or other object. An upright support leg is inserted in the inner sleeve, and the outer sleeve is rotated to compress the inner sleeve.

20 Claims, 15 Drawing Sheets

U.S. PATENT DOCUMENTS

| | | | |
|---|---|---|---|
| 4,819,902 A | 4/1989 | Wenger et al. | 248/460 |
| 5,037,057 A | 8/1991 | Andrews | 248/460 |
| 5,048,789 A * | 9/1991 | Eason et al. | 248/544 |
| 5,106,048 A | 4/1992 | Lebar et al. | 248/460 |
| 5,114,111 A | 5/1992 | Andrews | 248/460 |
| 5,341,185 A * | 8/1994 | Nakatani | 248/188.5 X |
| 5,417,511 A * | 5/1995 | Warden | 403/109.5 |
| 5,564,661 A | 10/1996 | Gershon | 248/167 |
| 5,636,824 A * | 6/1997 | Biasini et al. | 248/441.1 |
| 5,649,780 A * | 7/1997 | Schall | 403/109.5 X |
| 5,692,719 A | 12/1997 | Shepherd | 248/460 |
| 5,791,624 A | 8/1998 | Fedrick | 248/460 |
| 5,833,199 A | 11/1998 | Benting et al. | 248/441.1 |
| 5,871,185 A | 2/1999 | Phillips et al. | 248/167 |
| 5,887,314 A * | 3/1999 | Jordan, Jr. | 403/110 X |
| 5,918,997 A * | 7/1999 | Hsieh | 403/110 X |
| 5,979,857 A | 11/1999 | Holm | 248/451 |
| 6,113,586 A * | 9/2000 | Ouchi | 403/351 X |
| 6,142,698 A * | 11/2000 | Nutter | 403/109.1 |
| 6,543,960 B1 * | 4/2003 | Heid et al. | 403/351 |

* cited by examiner

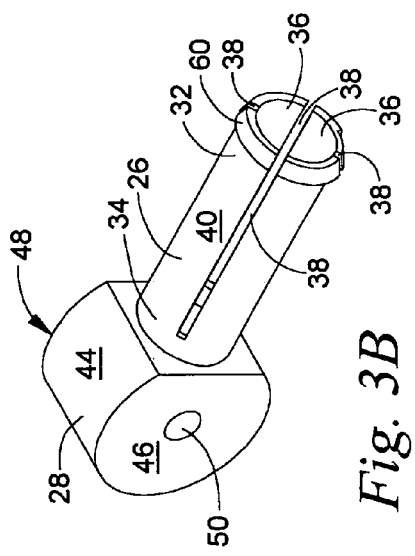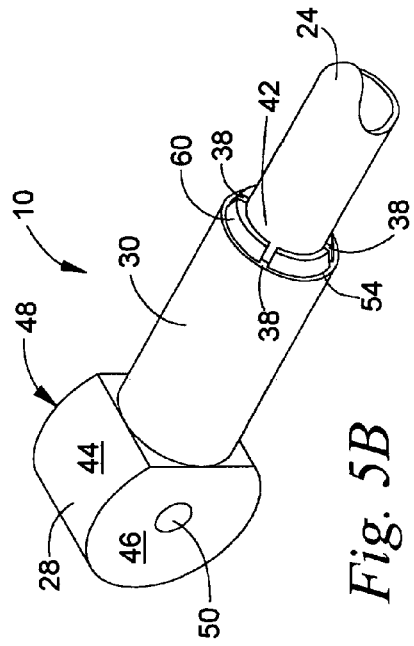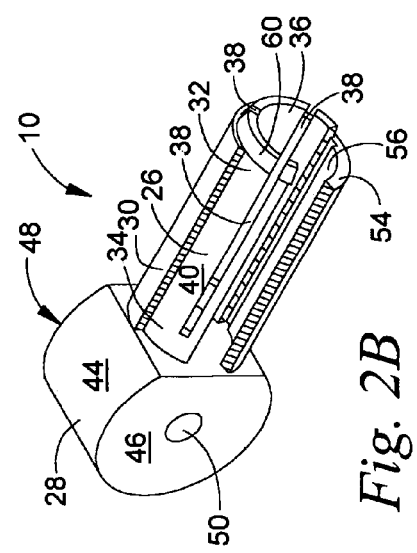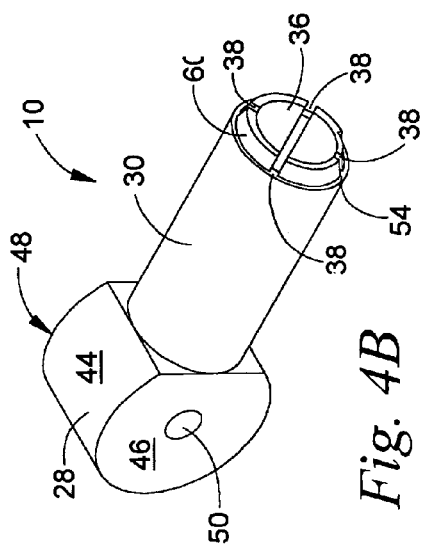

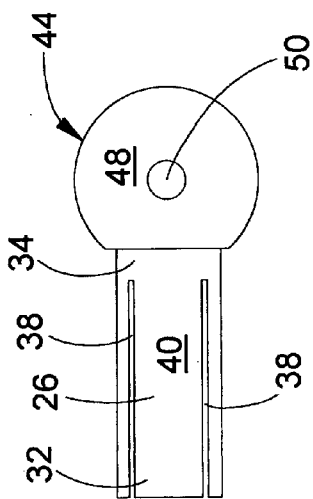
*Fig. 7B*
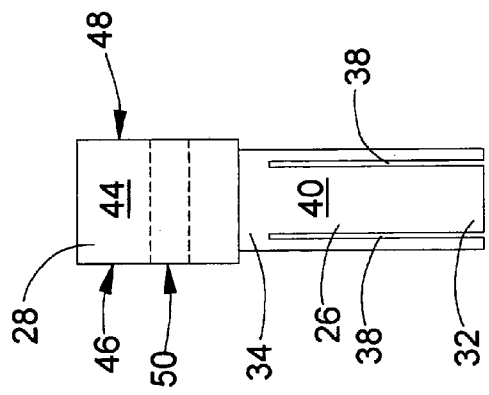
*Fig. 7D*  *Fig. 7C*
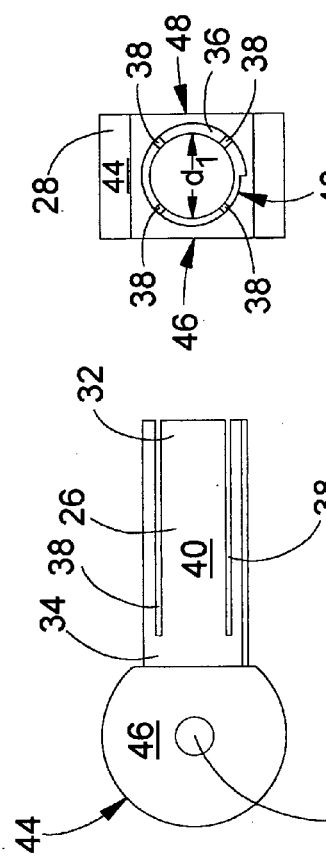
*Fig. 7A*

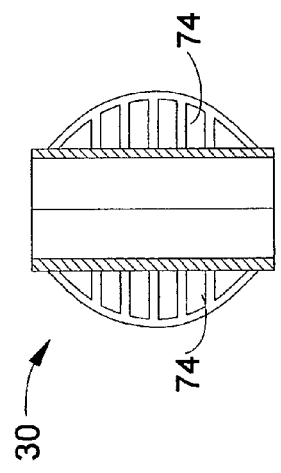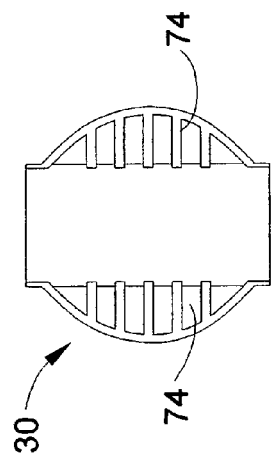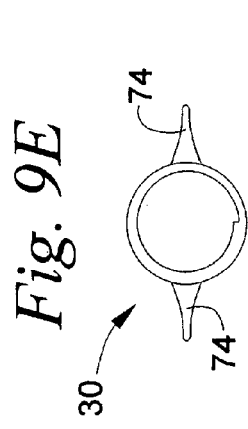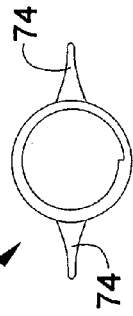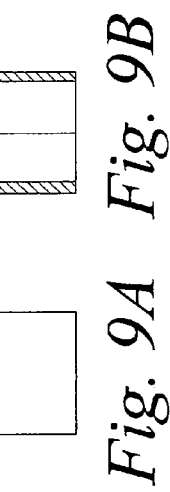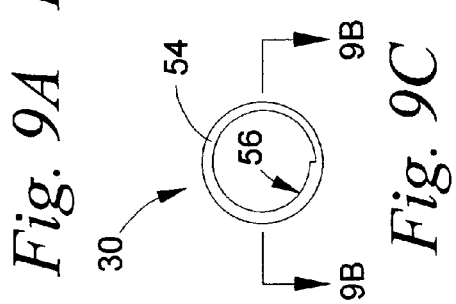

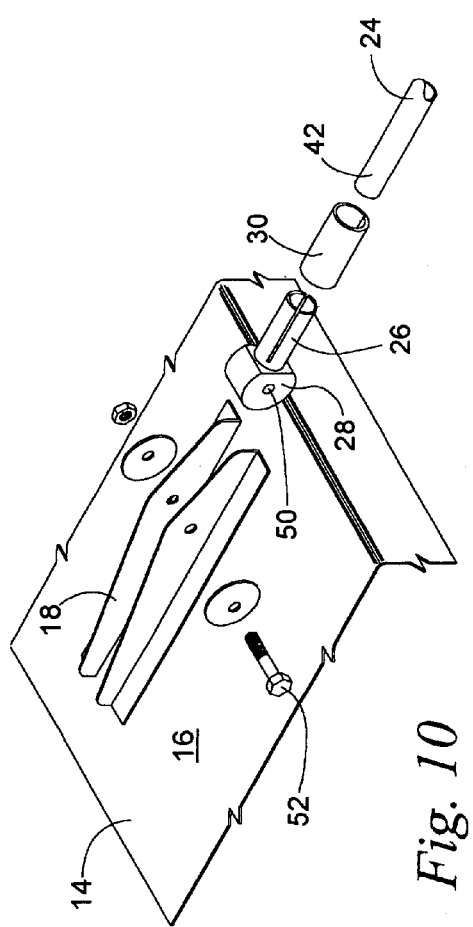
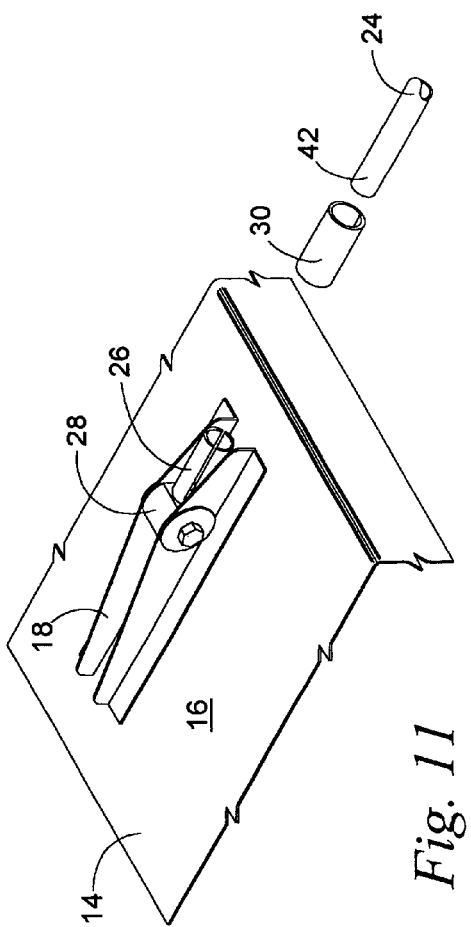

CAMMING COUPLER

CROSS REFERENCE TO RELATED APPLICATION

This application is a continuation-in-part of U.S. patent application Ser. No. 09/602,751, filed Jun. 23, 2000, now U.S. Pat. No. 6,543,960.

TECHNICAL FIELD

The invention relates to devices for coupling an object to a supporting shaft. More particularly, the invention relates to a releasable coupler for removably securing a music desk, desk top, table top or other object to a supporting shaft.

BACKGROUND OF THE INVENTION

A variety of tables and table like-devices exist that include one or more substantially vertical support legs. For example, most conventional music stands include a base, a shaft, and a desk. The base rests on the ground and holds the shaft in a vertical position. The desk is attachable to the shaft. Typically, the desk, table top, or other support surface is permanently attached. However, in some circumstances it is desirable to releasably attach the desk, table top, or other object so that it can be removed from the support leg or legs for transport and storage.

Several U.S. patents have provided devices for releasably attaching a music desk to its shaft. For example, U.S. Pat. No. 5,692,719 to Shepherd discloses a collapsible music stand. The music desk of Shepherd is seated on the shaft, and can be removed for transport and storage. U.S. Pat. No. 5,564,661 to Gershon discloses an attachment mechanism for a music desk that includes an arcuate notched coupling head attached to the shaft of the music stand. A spring loaded notched arm attached to the music desk locks the position of the music desk with respect to the shaft. When the arm is disengaged, the music desk can be removed from the coupling head. U.S. Pat. No. 5,636,824 to Biasini discloses a device for attaching the music desk to the shaft. The device includes a lever which can be rotated to compress a sleeve positioned on the shaft. Biasini also discloses a lever having an eccentric portion. When rotated, the lever applies pressure to the shaft of the music stand, thus securing the music desk to the shaft.

A need still exists, however, for an attachment device for removably securing a music desk, table top, or other support surface to one or more support legs, which is simple and inexpensive to manufacture, is durable, and is also effective and easy to use.

Additionally, a need exists for an aesthetically pleasing attachment device for securing a music desk to a music stand. A music stand in use by a musician is frequently in full view of an audience, and thus must be attractive and simple in design to avoid being visually distracting.

Furthermore, an attachment device for removably securing a music desk table top, or other object to one or more support legs, which minimizes damage to the support leg or legs.

BRIEF DESCRIPTION OF DRAWINGS

FIG. 2B is a cut away perspective view of a preferred embodiment of the camming coupler of the present invention;

FIG. 3B is a partial perspective view of a preferred embodiment of the camming coupler of the present invention;

FIG. 4B is a perspective view of a preferred embodiment of the camming coupler of the present invention;

FIG. 5B is a perspective view of a preferred embodiment of the camming coupler of the present invention;

FIG. 7A is a side view of the inner sleeve and attachment member of a preferred embodiment of the camming coupler of the present invention;

FIG. 7B is a side view of the inner sleeve and attachment member of a preferred embodiment of the camming coupler of the present invention;

FIG. 7C is an end view of the inner sleeve and attachment member of a preferred embodiment of the camming coupler of the present invention;

FIG. 7D is a side view of the inner sleeve and attachment member of a preferred embodiment of the camming coupler of the present invention;

FIG. 9A is a side view of the outer sleeve of a preferred embodiment of the camming coupler of the present invention;

FIG. 9B is a section view of the outer sleeve of a preferred embodiment of the camming coupler of the present invention;

FIG. 9C is an end view of the outer sleeve of a preferred embodiment of the camming coupler of the present invention;

FIG. 9D is a section view of the outer sleeve of a preferred embodiment of the camming coupler of the present invention;

FIG. 9E is a side view of the outer sleeve of a preferred embodiment of the camming coupler of the present invention;

FIG. 9F is an end view of the outer sleeve of a preferred embodiment of the camming coupler of the present invention;

FIG. 10 is an exploded partial perspective view of a music stand incorporating a preferred embodiment of the camming coupler of the present invention;

FIG. 11 is an exploded partial perspective view of a music stand incorporating a preferred embodiment of the camming coupler of the present invention;

DETAILED DESCRIPTION OF SPECIFIC EMBODIMENTS

Figure 1A:
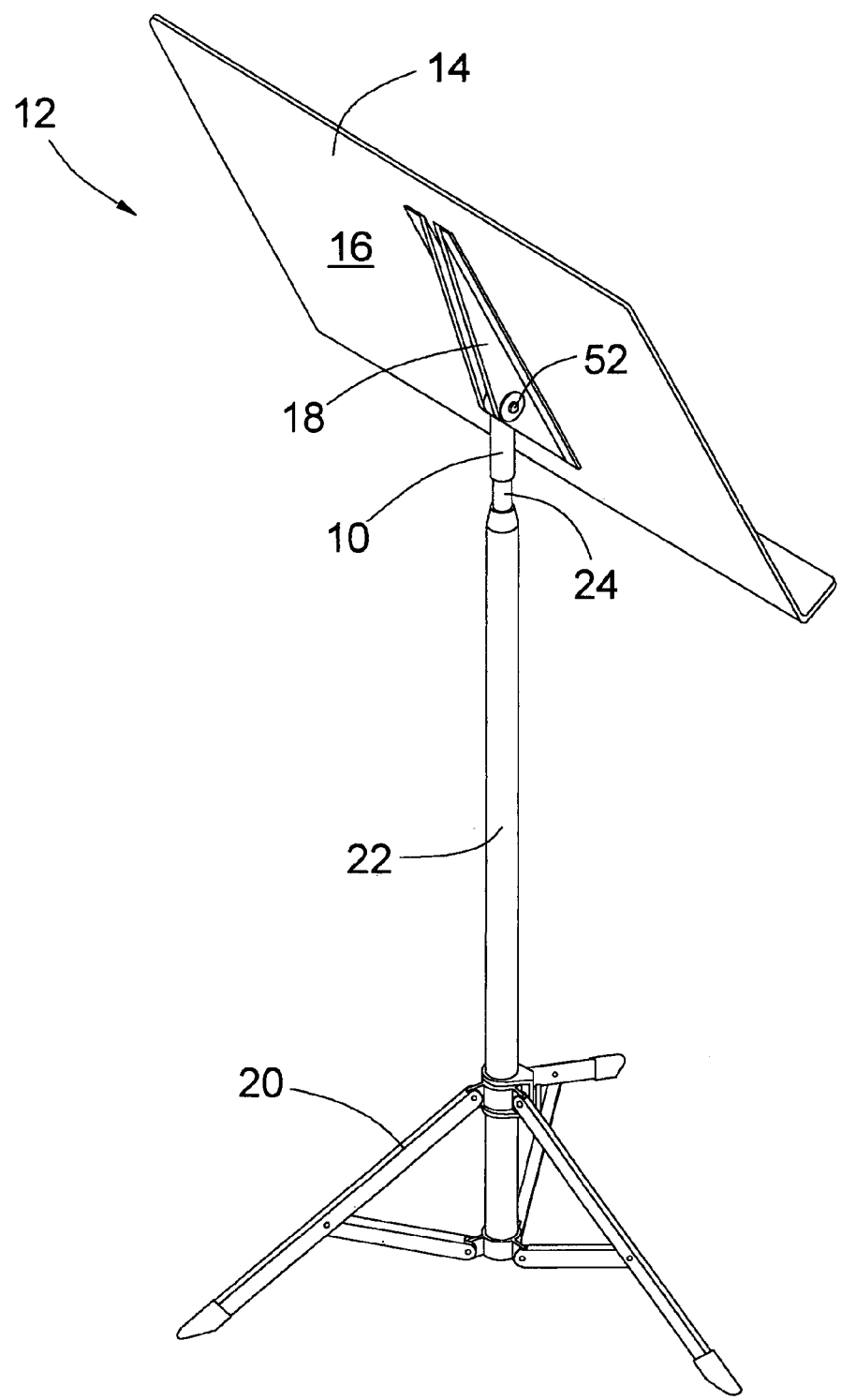
FIG. 1A is a perspective view of a music stand incorporating an embodiment of the camming coupler of the present invention.
Figure 1B:
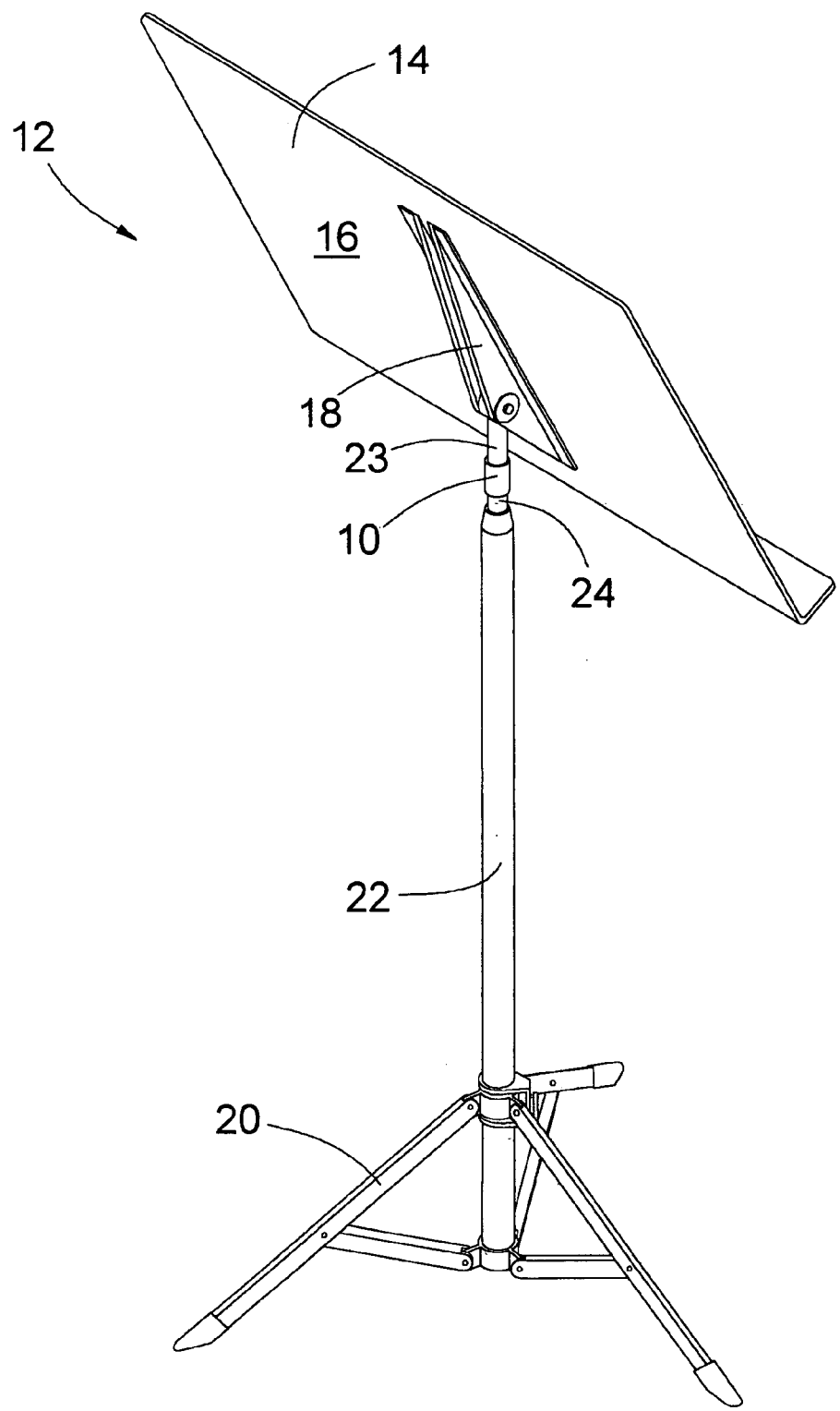
FIG. 1B is a perspective view of a music stand incorporating an additional embodiment of the camming coupler of the present invention.
Figure 2A:
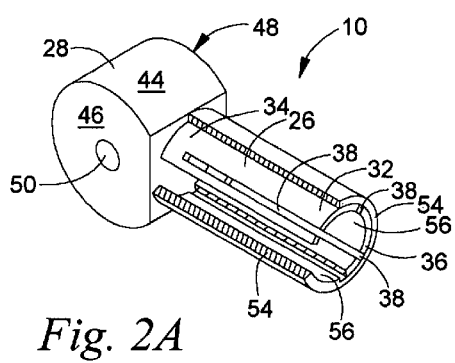
FIG. 2A is a cut away perspective view of a preferred embodiment of the camming coupler of the present invention.
Figure 3A:
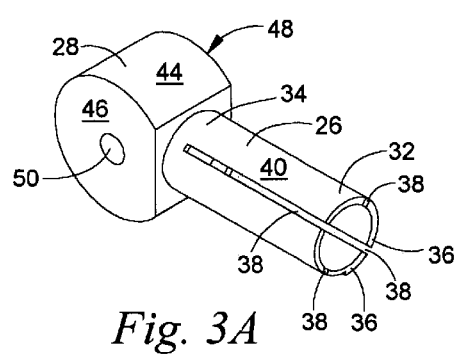
FIG. 3A is a partial perspective view of a preferred embodiment of the camming coupler of the present invention.
Figure 4A:
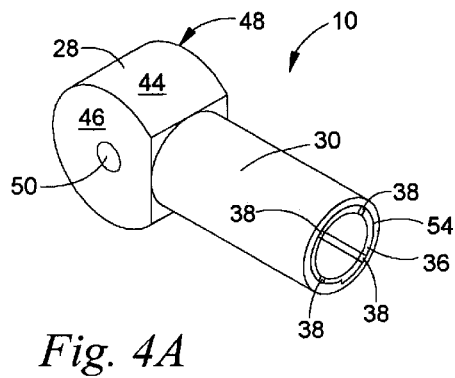
FIG. 4A is a perspective view of a preferred embodiment of the camming coupler of the present invention.
Figure 5A:
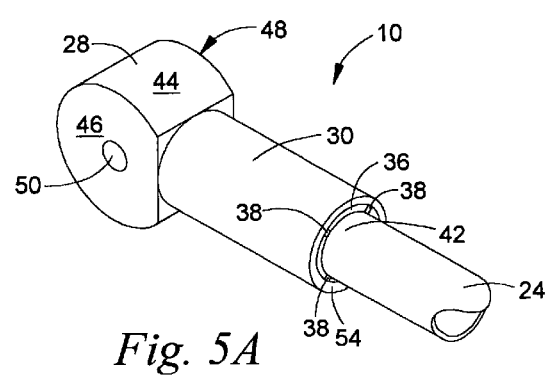
FIG. 5A is a perspective view of a preferred embodiment of the camming coupler of the present invention.

The camming coupler 10 of the present invention is illustrated in the accompanying figures. FIGS. 1A and 1B show the camming coupler in use on a music stand 12 of an otherwise conventional design. The music stand includes a music desk 14 having a surface 16. A bracket 18 is secured to the surface of the music desk. The music stand further includes a base 20, and an upright support 22 extending substantially vertically from the base. The upright support is typically a stationary shaft, and usually includes a telescoping shaft 24 received therein, as shown in FIGS. 1A and 1B. The music stand described and shown is representative of a conventional music stand. The camming coupler of the present invention may be used with any music stand having these basic features.

Figures 8A, 8B, 8C, 8D:
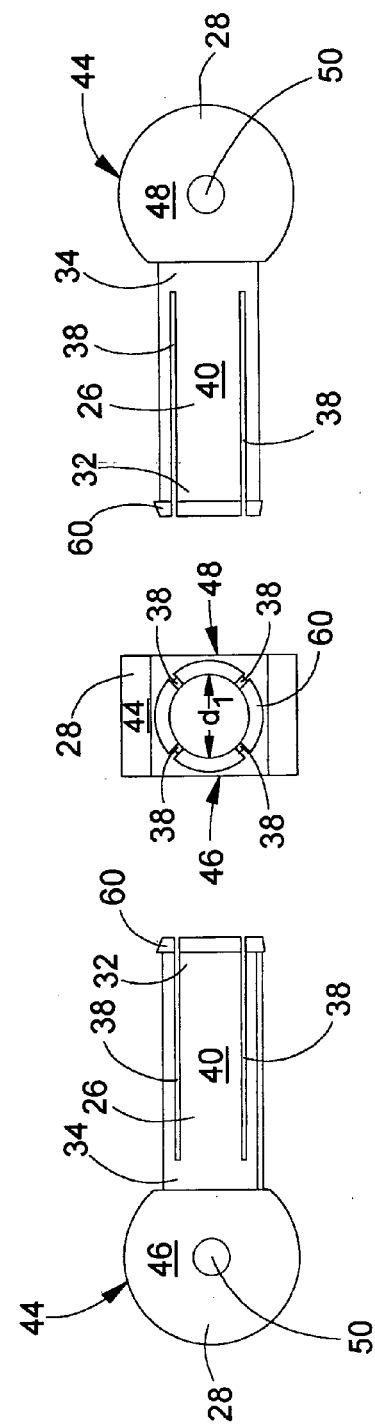
FIG. 8A is a side view of the inner sleeve and attachment member of a preferred embodiment of the camming coupler of the present invention.
FIG. 8B is a side view of the inner sleeve and attachment member of a preferred embodiment of the camming coupler of the present invention.
FIG. 8C is an end view of the inner sleeve and attachment member of a preferred embodiment of the camming coupler of the present invention.
FIG. 8D is a side view of the inner sleeve and attachment member of a preferred embodiment of the camming coupler of the present invention.
Figure 14:
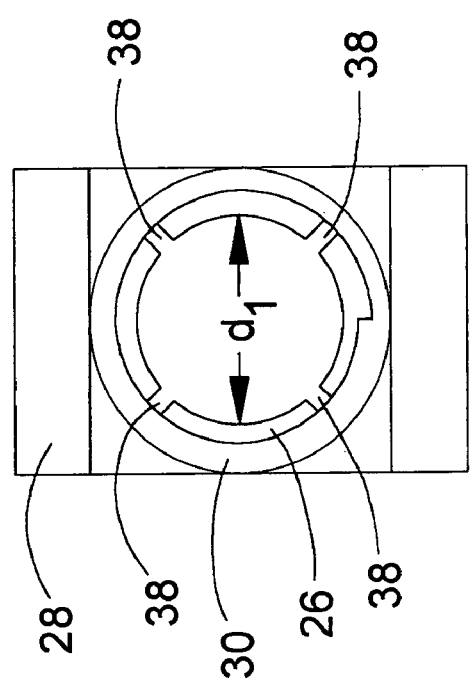
FIG. 14 is an end view of a preferred embodiment of the camming coupler of the present invention.
Figure 16:
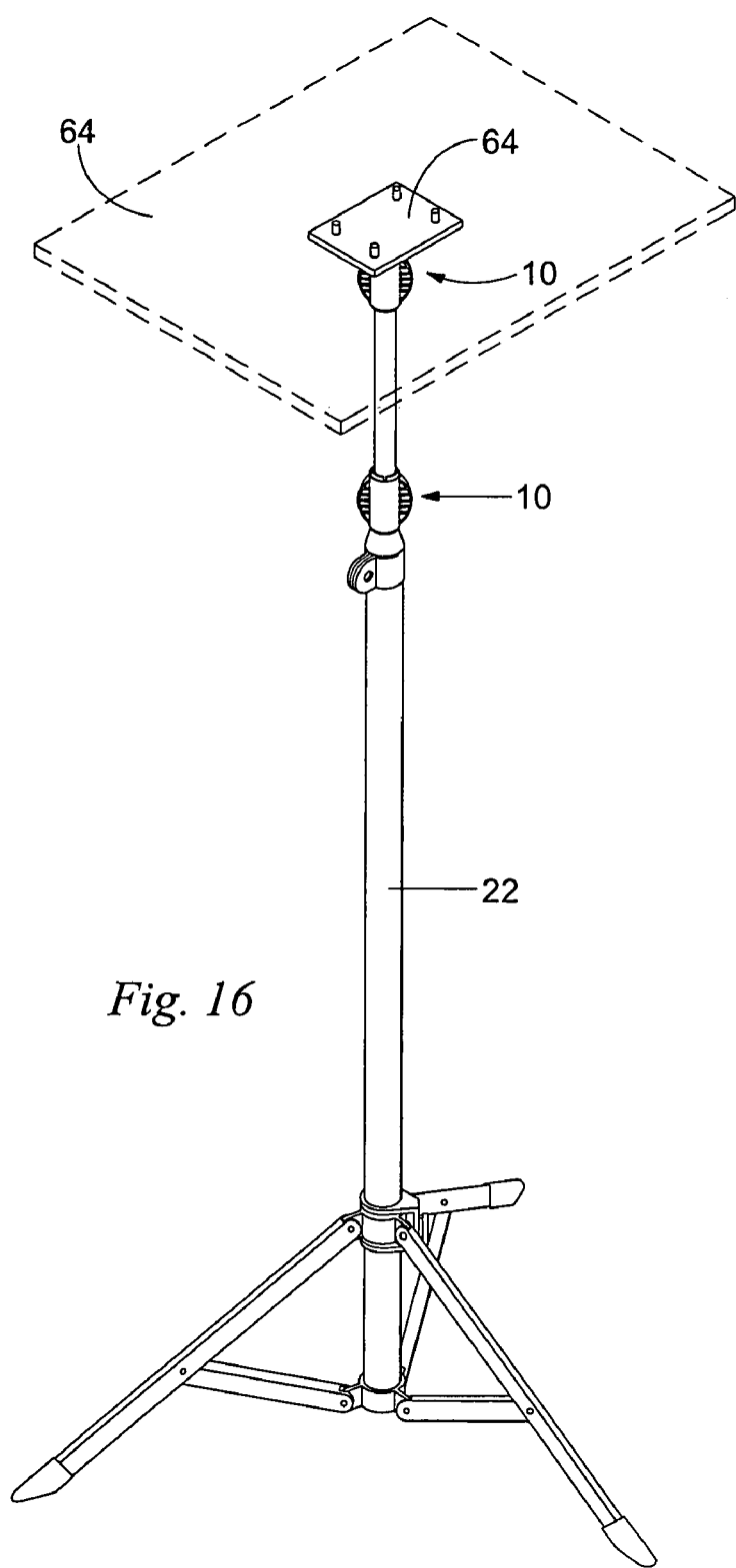
FIG. 16 is a perspective view of a table incorporating a preferred embodiment of the camming coupler of the present invention.
Figure 17:
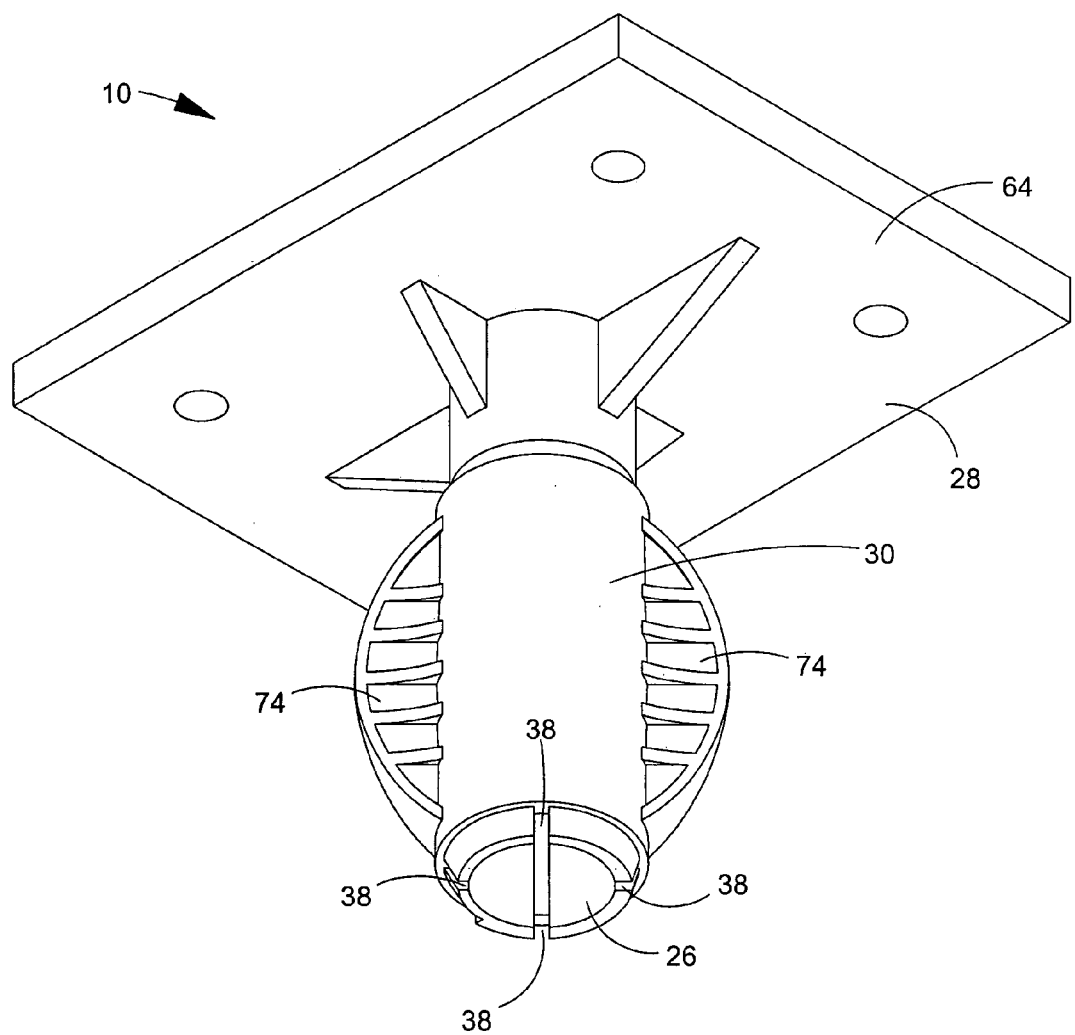
FIG. 17 is a perspective view of a preferred embodiment of the camming coupler of the present invention.

The camming coupler 10 includes an inner sleeve 26, an attachment member 28 extending from the inner sleeve, and an outer sleeve 30, and is detailed in FIGS. 2A through 9E and FIGS. 16 through 19E. The inner sleeve 26 of the camming coupler is hollow and substantially cylindrical in shape, and has a distal end 32 and a proximal end 34, as shown in FIGS. 7A, 7B, 7C, 7D, 8A, 8B, 8C and 8D. The inner sleeve includes an inner sleeve wall 36 and has an uncompressed internal diameter $d_1$, as shown in FIGS. 7C, 8C and 14. The internal diameter of the inner sleeve can be reduced slightly by compressing the inner sleeve. Preferably, this is made possible by providing at least one longitudinal slit 38 in the inner sleeve wall, extending from the distal end of the inner sleeve toward the proximal end. More preferably, a plurality of slits is provided, and in a most preferred embodiment, the inner sleeve includes four substantially equidistant longitudinal slits, as shown in the drawings. The inner sleeve wall increases in thickness around the outer circumference of the wall to form a cammed exterior surface 40, as best seen in FIG. 7C. The inner sleeve is sized to receive an upper end 42 of the telescoping shaft 24 of the music stand 12.

The attachment member 28 of the camming coupler 10 extends from and is affixed to the inner sleeve 26, as shown in FIGS. 2A through 8D. Preferably, the attachment member and the inner sleeve form a single contiguous unit. In this embodiment, the attachment member provides a means for pivotally securing the inner sleeve to the music desk. Preferably, the attachment member is secured to the bracket 18 of the music desk 14. In the embodiment shown in the drawings, the attachment member has a rounded outer surface 44 and flat side surfaces 46 and 48 to allow pivotal movement of the attachment member and inner sleeve. Alternatively, the attachment member may have any shape or configuration which can be pivotally secured to the music desk bracket. Preferably, a bolt hole 50 is provided through the attachment member for receiving an attachment bolt 52. Other attachment devices, such as pins, screws, rivets and the like are also contemplated.

Figure 6:
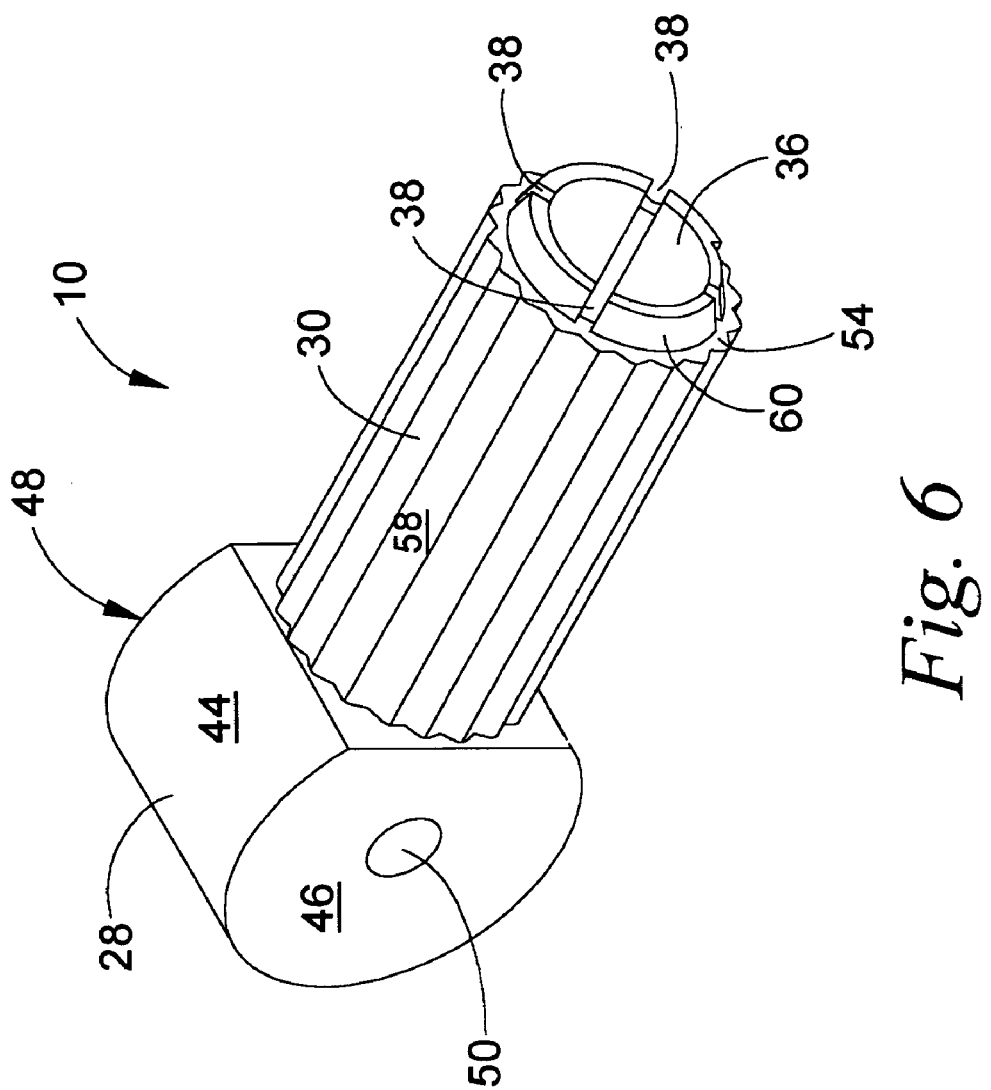
FIG. 6 is a perspective view of a preferred embodiment of the camming coupler of the present invention.

The outer sleeve 30 of the camming coupler is detailed in FIGS. 9A through 9F. The outer sleeve is hollow and preferably substantially cylindrical in shape, and includes an outer sleeve wall 54. The outer sleeve wall increases in thickness around the inner circumference of the outer sleeve to form a cammed interior surface 56, as best seen in FIGS. 9C and 9F. In an embodiment, the outer sleeve includes a textured exterior surface 58 as shown in FIG. 6. Alternatively, the outer sleeve may include one or more lobed projections 74, as shown in FIGS. 9D through 9F, to aid in gripping the outer sleeve. Any surface shaping, texture or coating which improves the gripping surface of the outer sleeve may be employed, and is considered part of the invention.

The outer sleeve 30 of the camming coupler 10 is sized to be received over the inner sleeve 26, as shown in FIGS. 2A, 2B, 4A, 4B, 5A, 5B, 6, 12 and 13. The cammed exterior surface 40 of the inner sleeve corresponds to the cammed interior surface 56 of the outer sleeve. In an embodiment, the inner sleeve has a lip 60 on the distal end 32 for retaining the outer sleeve in position over the inner sleeve. Preferably, the lip is chamfered, as shown in FIGS. 2B, 3B, 4B, 5B, 6, 8A, 8B, 8C, 8D, 19A, 19B, and 19D.

The camming coupler 10 of the present invention is described and shown as being secured to a music desk 14, for releasable attachment to an upright support 22 of a music stand 12. It will be appreciated, however, that it is within the scope of the invention to secure the camming coupler to the upright support of the music stand for releasable attachment to an attachment shaft 23 provided on the music desk, as shown in FIG. 1B.

In use, the camming coupler 10 of the present invention provides a means for removably attaching a music desk 14 to the upright support 22 of a music stand 12. The inner sleeve 26 is pivotally secured to the music desk, preferably by passing an attachment bolt 52 or other suitable securing device through holes in the bracket 18 attached to the surface 16 of the music desk, and through the bolt hole 50 of the attachment member 28 extending from the inner sleeve, as shown in FIGS. 10, 11, 12 and 13. The attachment bolt is secured in place with a nut, cap or other suitable device.

Figure 12:
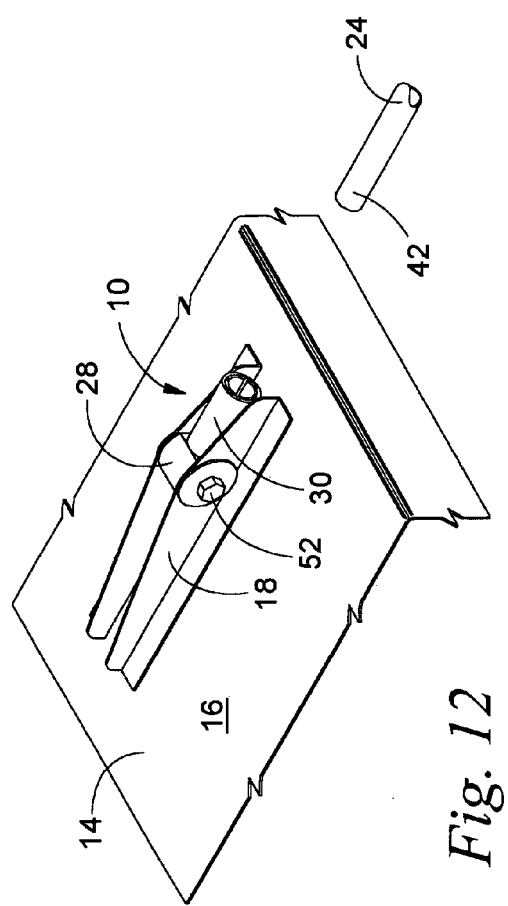
FIG. 12 is a partial perspective view of a music stand incorporating a preferred embodiment of the camming coupler of the present invention.
Figure 13:
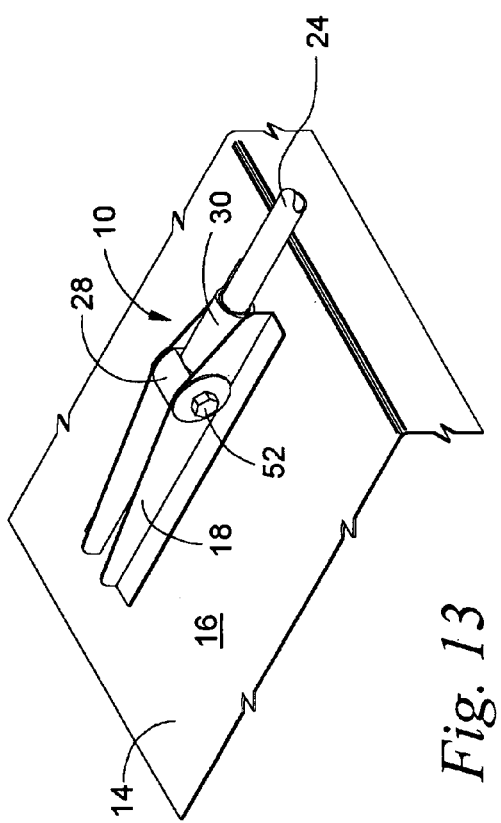
FIG. 13 a partial perspective view of a music stand incorporating a preferred embodiment of the camming coupler of the present invention.

The outer sleeve 30 of the camming coupler is then positioned over the inner sleeve 26, as shown in FIG. 12. In an embodiment, the lip 60 retains the outer sleeve 30 in position over the inner sleeve 26.

In order to secure the camming coupler 10 to the upper end 42 of the telescoping shaft 24 of the music stand, the inner sleeve 26 and the outer sleeve 30 must first be aligned, as shown in FIG. 14. The inner sleeve and the outer sleeve must be in nesting alignment, so that the cammed outer surface 40 of the inner sleeve corresponds with the cammed inner surface 56 of the outer sleeve. When the inner sleeve and the outer sleeve are in nesting alignment, the inner sleeve is in an uncompressed state, and has an uncompressed inner diameter of $d_1$, as shown in FIGS. 7C, 8C and 14. In the uncompressed state, the inner sleeve can receive the upper end of the telescoping shaft.

Figure 15:
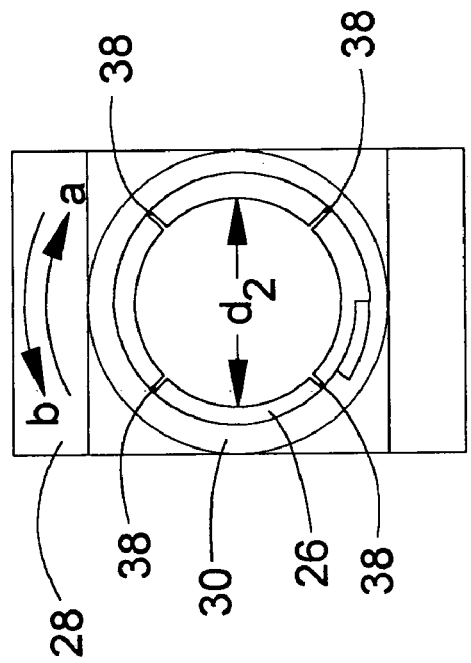
FIG. 15 is an end view of a preferred embodiment of the camming coupler of the present invention.

The upper end 42 of the telescoping shaft 24 is inserted in the inner sleeve 26, and secured in position by rotating the outer sleeve 30 with respect to the inner sleeve, as indicated by directional arrow a in FIG. 15. The rotation of the outer sleeve moves the cammed inner surface 56 out of alignment with the cammed outer surface of the inner sleeve. The outer sleeve thus compresses the inner sleeve, to form a compressed internal diameter $d_2$ of the inner sleeve, as shown in FIG. 15. The compressed diameter $d_2$ is less than the uncompressed diameter $d_1$. In its compressed state, the inner sleeve clamps onto the upper end of the telescoping shaft, thus securely holding the music desk 14 in position on the telescoping shaft.

The action of securing the music desk 14 to the telescoping shaft 24 with the camming coupler 10 is performed rapidly and easily by a user. Likewise, the removal of the music desk from the telescoping shaft, for transport and storage, is easy and fast. The user simply rotates the outer sleeve 30 of the camming coupler, as indicated by the directional arrow b in FIG. 15, to return the inner sleeve 26 to an uncompressed state, and to return the outer sleeve to the position of nesting alignment shown in FIG. 14. The inner sleeve will no longer clamp the upper end of the telescoping shaft, and the music desk can be lifted off the telescoping shaft for transport and storage.

In a preferred embodiment, the camming coupler of the present invention is adapted to removably secure a removable component to one or more support legs. In the embodiment shown in FIGS. 16 and 17, a table top 62 is removably secured to a support leg using a camming coupler to form a table. For the purposes of this application, a table is defined as any support device attachable to one or more support legs. The combination of a table top and one or more support legs results in a table that may serve a variety of functions, such as a laptop computer stand, monitor stand, drum stand, keyboard stand, etc. In this embodiment, the attachment member 28 is a substantially planar, plate-like member 64 extending from the inner sleeve 26, perpendicular to the longitudinal axis of the inner sleeve and the outer sleeve 30. The plate-like member is securable to the removable table top by screws, rivets, adhesive, welding, or any other known device or method.

As noted above, the attachment member 28 of the present invention may be configured to be secured to a music desk or table top. The attachment member may alternatively be configured to be secured to other objects (not shown).

In an additional embodiment of the invention, shown in FIG. 18 and FIG. 19A through 19E, the camming coupler 10 is adapted to secure an adjustable-height support leg, such as an upright support of a music stand, in a selected position. An adjustable-height support leg typically includes two components: an upright support 22, and a telescoping shaft 24. The telescoping shaft, having a diameter that is smaller than the diameter of the upright support, is slidably received within the upright support. To adjust the height of the support leg, the relative position of the telescoping shaft within the upright support is adjusted. Although many adjustable-height support legs are designed to maintain their adjusted position when force is applied, it is beneficial to further secure the support leg in position when additional force or additional weight, is applied to the support leg.

Figure 18:
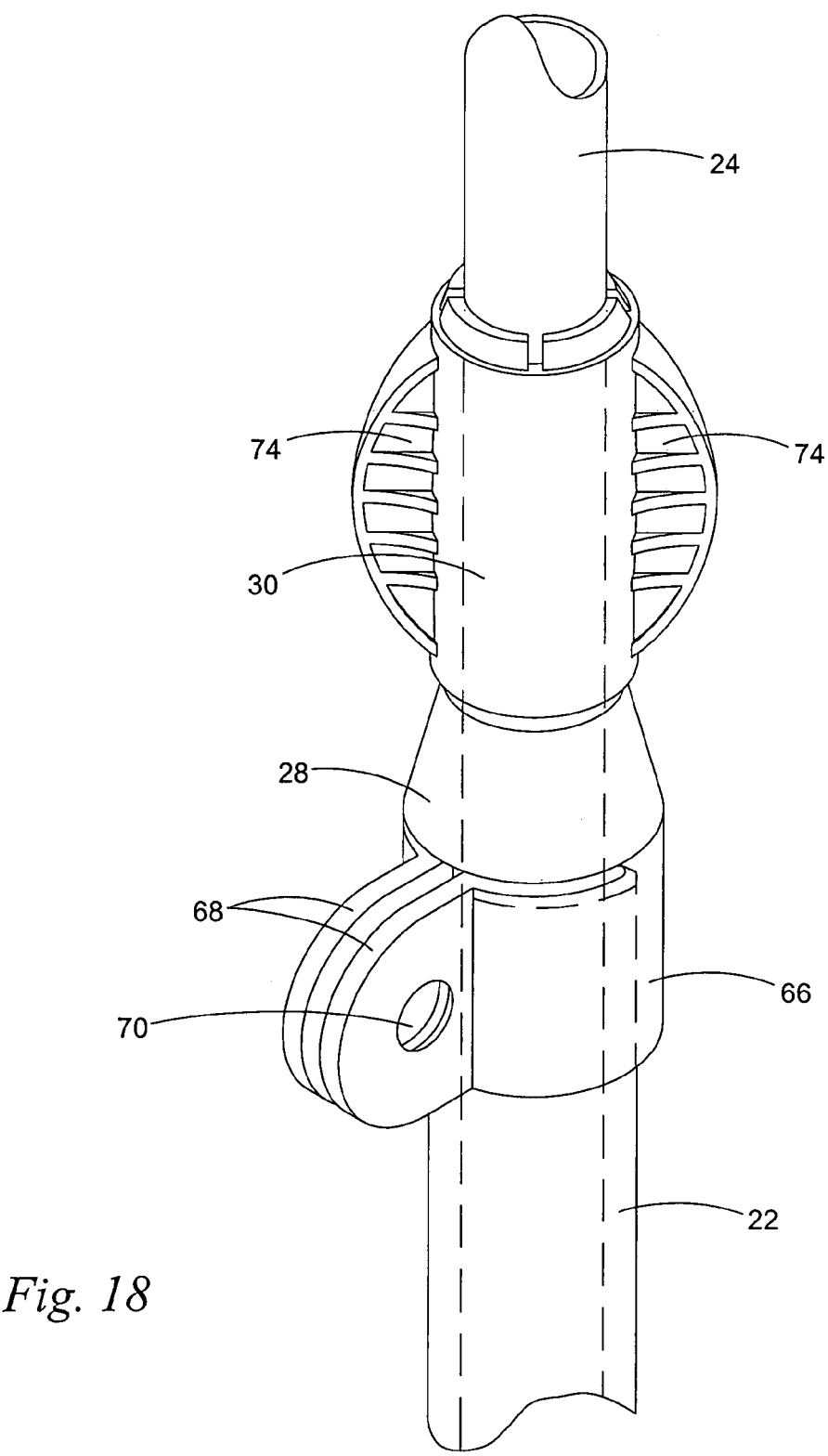
FIG. 18 is a perspective view of a preferred embodiment of the camming coupler of the present invention.
Figure 19E:
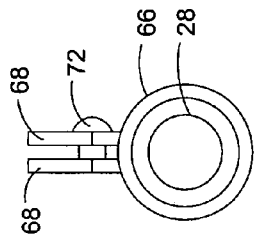
FIG. 19E is a top view of the inner sleeve and attachment member of a preferred embodiment of the camming coupler of the present invention.
Figure 19B:
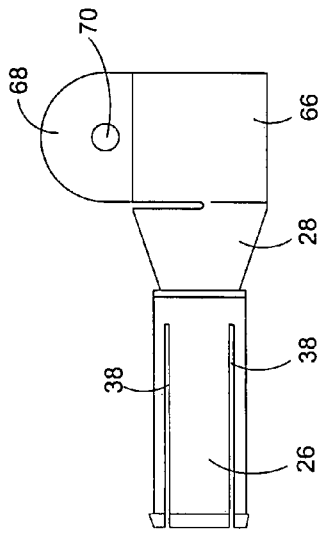
FIG. 19B is a side view of the inner sleeve and attachment member of a preferred embodiment of the camming coupler of the present invention.
Figure 19D:
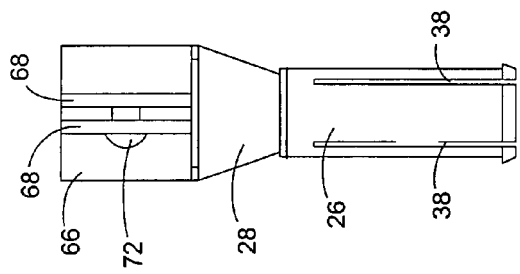
FIG. 19D is a side view of the inner sleeve and attachment member of a preferred embodiment of the camming coupler of the present invention.
Figure 19C:
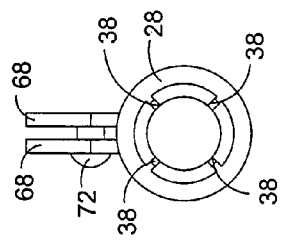
FIG. 19C is an end view of the inner sleeve and attachment member of a preferred embodiment of the camming coupler of the present invention.
Figure 19A:
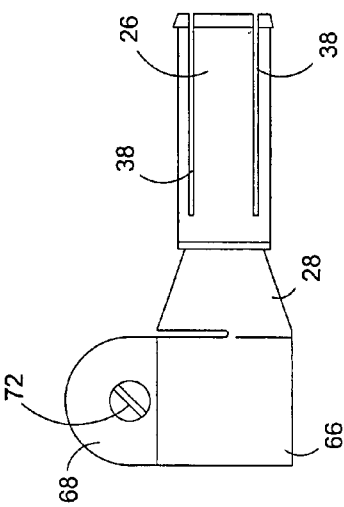
FIG. 19A is a side view of the inner sleeve and attachment member of a preferred embodiment of the camming coupler of the present invention.

In this embodiment, the attachment member 28 of the camming coupler 10 comprises a clamping sleeve 66 as shown in FIGS. 19A through 19E. The clamping sleeve is coaxial with and substantially parallel to the longitudinal axis of the inner sleeve 28. The clamping sleeve is adapted to be received and secured on the end of the upright support 22, as shown in FIG. 18. In an embodiment, a pair of flanges 68 extends from the clamping sleeve. Each flange includes a hole 70 for receiving a screw or bolt 72, which can be tightened to compress the flanges, securing the clamping sleeve on the upright support. Other means of clamping a sleeve to a shaft are known in the art, and are considered to be within the scope of the invention. The telescoping shaft 24 is receivable in the inner sleeve 26 of the camming coupler.

In use, the camming coupler 10 of this embodiment is secured to the upright support 22 of an adjustable height support leg by securing the clamping sleeve 66 on the end of the upright support, as shown in FIG. 18. The telescoping shaft 24 of the adjustable height support leg is inserted through the inner sleeve 26 of the camming coupler, and into the upright support. The relative position of the upright support and the telescoping shaft is adjusted and then secured by rotating the outer sleeve 30 of the camming coupler to compress the inner sleeve as described above.

In compliance with the statutes, the invention has been described in language more or less specific as to structural features and process steps. While this invention can be embodied in different forms, the specification describes and illustrates preferred embodiments of the invention. It will be understood that this disclosure is an exemplification of the principles of the invention, and is not intended to limit the invention to the particular embodiments described. Those with ordinary skill in the art will appreciate that other embodiments and variations of the invention, which employ the same inventive concepts as the invention, are possible. Therefore, the invention is not to be limited except by the following claims, as appropriately interpreted in accordance with the doctrine of equivalents.

What is claimed is:

1. A camming coupler for removably attaching a music desk to an upright support of a music stand, the camming coupler including:

an inner sleeve for receiving the upright support, the inner sleeve having a cammed exterior surface, substantially the entire exterior surface increasing in thickness around its outer circumference, starting from a point of minimum thickness and ending at a point of maximum thickness adjacent to the point of minimum thickness, to form a single inner sleeve cam lobe, and the inner sleeve has at least one longitudinal slit formed therein;

an attachment member integral with and extending from the inner sleeve, the attachment member adapted to be pivotally attached to the music desk;

the inner sleeve receivable within an outer sleeve, the
outer sleeve having a cammed interior surface, substantially the entire cammed interior surface increasing in thickness around its inner circumference, starting from a point of minimum thickness and ending at a point of maximum thickness adjacent to the point of minimum thickness, to form a single outer sleeve cam lobe, the cammed interior surface of the outer sleeve substantially corresponding to the cammed exterior surface of the inner sleeve; and the outer sleeve is rotatable between a position of nesting alignment with the inner sleeve and with substantially the entire cammed interior surface of the outer sleeve and substantially the entire cammed exterior surface of the inner sleeve in nesting alignment; and a position of compressing engagement with the inner sleeve.

2. The camming coupler of claim 1, wherein the inner sleeve has a distal end, and the inner sleeve further includes a lip at the distal end for retaining the outer sleeve in position over the inner sleeve.

3. The camming coupler of claim 1, wherein the outer sleeve has textured exterior surface.

4. The camming coupler of claim 1, wherein the outer sleeve has a shaped exterior surface, the shaped exterior surface for providing an improved gripping surface.

5. The camming coupler of claim 4, wherein the shaped outer surface includes at least one lobed projection.

6. The camming coupler of claim 1, wherein the inner sleeve includes a plurality of longitudinal slits.

7. The camming coupler of claim 1, wherein the inner sleeve includes four substantially equidistant longitudinal slits.

8. The camming coupler of claim 1, wherein the attachment member comprises a substantially cylindrical protrusion having a longitudinal axis substantially perpendicular to the longitudinal axis of the inner and outer sleeves.

9. The camming coupler of claim 1, wherein the attachment member includes a bolt hole adapted to allow pivotable attachment of the attachment member to a bracket on the music desk.

10. A camming coupler for securing a removable component to a support leg, the camming coupler including:
an inner sleeve for receiving the support leg, the inner sleeve having a cammed exterior surface, substantially the entire cammed exterior surface increasing in thickness around its outer circumference, starting from a point of minimum thickness and ending at a point of maximum thickness adjacent to the point of minimum thickness, to form a single inner sleeve cam lobe, and inner sleeve has at least one longitudinal slit formed therein;
an attachment member integral with and extending from the inner sleeve, the attachment member adapted to be secured to the removable component;
the inner sleeve receivable within an outer sleeve, the outer sleeve having a cammed interior surface, substantially the entire interior surface increasing in thickness around its inner circumference, starting from a point of minimum thickness and ending at a point of maximum thickness adjacent to the point of minimum thickness to form a single outer sleeve cam lobe, the cammed interior surface of the outer sleeve substantially corresponding to the cammed exterior surface of the inner sleeve; and
the outer sleeve is rotatable between a position of nesting alignment with the inner sleeve and with substantially the entire cammed interior surface of the outer sleeve and substantially the entire cammed exterior surface of the inner sleeve in nesting alignment; and a position of compressing engagement with the inner sleeve.

11. The camming coupler of claim 10, wherein the attachment member comprises a substantially planar upper surface perpendicular to the longitudinal axis of the inner sleeve.

12. The camming coupler of claim 10, wherein the inner sleeve has a distal end, and the inner sleeve further includes a lip at the distal end for retaining the outer sleeve in position over the inner sleeve.

13. The camming coupler of claim 10, wherein the outer sleeve has a textured exterior surface.

14. The camming coupler of claim 10, wherein the outer sleeve has a shaped exterior surface, the shaped exterior surface for providing an improved gripping surface.

15. The camming coupler of claim 14, wherein the shaped outer surface includes at least one lobed projection.

16. The camming coupler of claim 10, wherein the inner sleeve includes a plurality of longitudinal slits.

17. The camming coupler of claim 10, wherein the inner sleeve includes four substantially equidistant longitudinal slits.

18. A camming coupler for removably attaching a music desk to an upright support of a music stand, the music desk including an attachment shaft secured thereto, and the camming coupler including:
an inner sleeve for receiving the attachment shaft, the inner sleeve securable to the upright support of the music stand, the inner sleeve having at least one longitudinal slit formed therein, and the inner sleeve having a cammed exterior surface, substantially the entire exterior surface increasing in thickness around its outer circumference, starting from a point of minimum thickness and ending at a point of maximum thickness adjacent to the point of minimum thickness to form a single inner sleeve cam lobe;
an outer sleeve, the outer sleeve having a cammed interior surface, substantially the entire interior surface increasing in thickness around its inner circumference, starting from a point of minimum thickness and ending at a point of maximum thickness adjacent to the point of minimum thickness, to form a single outer sleeve cam lobe, the cammed interior surface of the outer sleeve substantially corresponding to cammed exterior surface of the inner sleeve; and
the inner sleeve is receivable with the outer sleeve, and the outer sleeve is rotatable between a position of nesting alignment with the inner sleeve, wherein substantially the entire interior surface of the outer sleeve and substantially the entire exterior surface of the inner sleeve arc in nesting alignment, and a position of compressing engagement with the inner sleeve.

19. A table, the table comprising a substantially planar table top, at least one substantially vertical support leg, and a camming coupler for removably securing the table top to the support leg, the camming coupler comprising:
an inner sleeve for removably receiving the support leg, the inner sleeve increasing in thickness around its outer circumference, starting from a point of minimum thickness and ending at a point of maximum thickness adjacent to the point of minimum thickness, to form a cammed exterior surface having a single inner sleeve cam lobe, and the inner sleeve having at least one longitudinal slit formed therein;
an attachment member affixed to and extending from the inner sleeve, the attachment member comprising a substantially planar upper surface perpendicular to the longitudinal axis of the inner sleeve, the attachment member secured to the table top;

the inner sleeve is receivable within an outer sleeve, the outer sleeve increasing in thickness around its inner circumference, starting from a point of minimum thickness and ending at a point of maximum thickness adjacent to the point of minimum thickness, to form a single outer sleeve cam lobe, the cammed interior surface of the outer sleeve surface substantially corresponding to the cammed exterior surface of the inner sleeve and the outer sleeve is rotatable between a position of nesting alignment with the inner sleeve with substantially the entire cammed interior surface of the outer sleeve and substantially the entire cammed exterior surface of the inner sleeve in nesting alignment; and a position of compressing engagement with the inner sleeve.

20. A camming coupler, the camming coupler for securing the height of an adjustable-height support leg in a selected position, the adjustable-height support leg comprising an upright support and a telescoping shaft, the telescoping shaft slidably received within the upright support of the adjustable-height support leg, the camming coupler comprising:

an inner sleeve adapted to receive the telescoping shaft, the inner sleeve having a cammed exterior surface, with substantially the entire cammed exterior surface increasing in thickness around its outer circumference starting from a point of minimum thickness and ending at a point of maximum thickness adjacent to the point of minimum thickness to form a single inner sleeve cam lobe and the inner sleeve having at least one longitudinal slit formed therein;

an attachment member integral with and extending from the inner sleeve, the attachment member comprising a substantially cylindrical clamping sleeve coaxial with and substantially parallel to the longitudinal axis of the inner sleeve, the clamping sleeve adapted to be secured to the upright support of the adjustable-height support leg;

the inner sleeve receivable within an outer sleeve, the outer sleeve having a cammed interior surface, with substantially the entire cammed interior surface increasing in thickness around its inner circumference starting from a point of minimum thickness and ending at a point of maximum thickness adjacent to the point of minimum thickness, to form a single outer sleeve cam lobe, the cammed interior surface of the outer sleeve substantially corresponding to the cammed exterior surface of the inner sleeve and the outer sleeve is rotatable between a position of nesting alignment with the inner sleeve with substantially the entire cammed interior surface of the outer sleeve and substantially the entire cammed exterior surface of the inner sleeve in nesting alignment; and a position of compressing engagement with the inner sleeve.

\* \* \* \* \*

UNITED STATES PATENT AND TRADEMARK OFFICE
CERTIFICATE OF CORRECTION

PATENT NO. : 7,223,041 B1 Page 1 of 1
APPLICATION NO. : 10/409652
DATED : May 29, 2007
INVENTOR(S) : Barry Heid It is certified that error appears in the above-identified patent and that said Letters Patent is hereby corrected as shown below:

Column 1,
Line 59, "music desk table top," should read --music desk, table top,--;

Column 8,
Line 46, "with" should read --within--; and
Line 51, "arc" should read --are--.

Signed and Sealed this

Thirty-first Day of July, 2007

JON W. DUDAS
*Director of the United States Patent and Trademark Office*